United States Patent [19]

Hitora

[11] Patent Number: 4,577,178
[45] Date of Patent: Mar. 18, 1986

[54] REFLECTION TYPE FLOW-FLASHING LIGHT

[75] Inventor: Shozo Hitora, Nara, Japan

[73] Assignee: Sasaki Electric Manufacturing Co., Ltd., Osaka, Japan

[21] Appl. No.: 486,649

[22] Filed: Apr. 20, 1983

[51] Int. Cl.$^4$ .............................................. B60Q 1/46
[52] U.S. Cl. ................................... 340/81 R; 340/50; 340/84; 340/87
[58] Field of Search ..................... 340/81 R, 50, 84, 87

[56] References Cited

U.S. PATENT DOCUMENTS

| | | | |
|---|---|---|---|
| 3,404,371 | 10/1968 | Gosswiller | 340/50 |
| 4,104,614 | 8/1978 | Litman | 340/84 |
| 4,224,599 | 9/1980 | Peirish, Jr. et al. | 340/50 |
| 4,240,062 | 12/1980 | Gosswiller | 340/87 |

Primary Examiner—John W. Caldwell, Sr.
Assistant Examiner—Jeffery A. Brier
Attorney, Agent, or Firm—Birch, Stewart, Kolasch & Birch

[57] ABSTRACT

A reflection type flow-flashing light, used for issuing a warning signal, which is mounted on the roof of an emergency vehicle, characterized such that rotating lights are installed on the opposite side ends of a unit base, a plurality of reflecting plates against which a flood from the rotating lights reflects in both the forward and backward directions are spaced adequately between the opposite side sections of the rotating lights with the given inclining angles of the reflecting plate, which are different from each other, formed in relation to the rotating lights, respectively and at the same time spaces through which the flood therefrom pass are formed between the above-mentioned reflecting plates.

7 Claims, 6 Drawing Figures

REFLECTION TYPE FLOW-FLASHING LIGHT

BACKGROUND OF THE INVENTION

The present invention relates to a so-called reflection type flow-flashing light, mounted on the roof of an emergency vehicle such as a police patrol car, for flashing a flow-signal light in both the forward and backward directions.

The conventional reflection type flow-flashing light, generally used, employs such a structure as shown in FIGS. 5 & 6 in which a pair of rotating lights B are installed on the opposite corners of a unit base A, a reflecting joggled plate D on which reflection planes C, C, & C ... forming predetermined inclining angles to said rotating lights B, respectively are disposed, is installed between the opposite faces of the rotating lights B, under the arrangement of which a utilization of an action of refracting rays which takes place through the reflection of rays from the rotating lights B against the reflection planes C, C, & C may flash the light toward the front of the unit. While the foregoing disposition has a merit that the reflection effective area a, b, & c in relation to the forward direction of the unit, depending on angles of arranging the reflection planes C, C, & C ..., are very large, on the contrary, it is quite impossible that the reflection effective area in the relation to the backward direction of the unit becomes identical to that of the forward direction so that volume of light equally distributed to both the directions may be flashed, resulting in a shortcoming of the inability of serving as a warning signal light with the flashing effect which is produced equally in the forward and backward directions.

SUMMARY OF THE INVENTION

Characteristic of the present invention briefly lies in the arrangement in which the rotating lights are installed on the opposite side ends of the unit base, a plurality of reflecting plates used for the forward reflection or the backward reflection are adequately spaced with their predetermined inclining angles formed to said rotating lights, respectively, between the opposite faces of the rotating lights on the unit base and at the same time spaces through which the flooding rays from the rotating lights pass are formed between the above forward and backward reflecting plates.

In addition the present invention not only extremely enlarges the reflection effective area in relation to the forward and backward directions but also easily obtains a projection area where a non-reflection part of the reflecting plates is extremely small, of course, the reflection type flow-flashing light according to the present invention can effectively perform the signal function by means of flashing the flood from the rotating lights in both the forward and backward directions.

The primary purpose of the present invention, which has contemplated the foregoing shortcoming to improve the conventional type of flow-flashing light, is to provide the reflection type flow-flashing light, wherein the reflection planes are not arranged simply in an inclined-shape. A structure is provided in which their combined arrangement is made in a unique manner being employed, whereby the flood from the rotating lights is flashed in both the forward and backward directions, and at the same time a non-reflection part of the reflecting plate is adapted to be extremely small, resulting in a considerably larger effective area, whereby a signalling function is more effectively attained.

BRIEF DESCRIPTION OF THE DRAWINGS

The accompanying drawings, illustrating the embodiment of the present invention and the conventional example, in which.

DETAILED DESCRIPTION OF THE INVENTION

Figure 1:
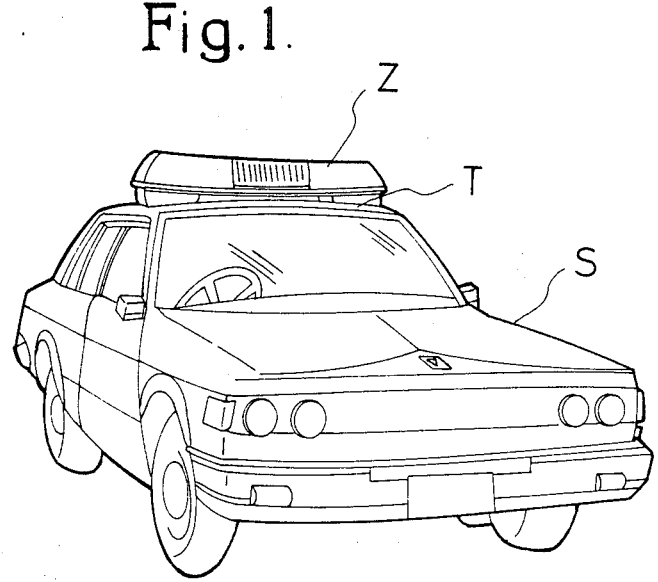
FIG. 1 is a perspective view of the case in which the reflection type flow-flashing light according to the present invention is mounted on the roof of the emergency vehicle such as the police patrol car.
Figure 2:
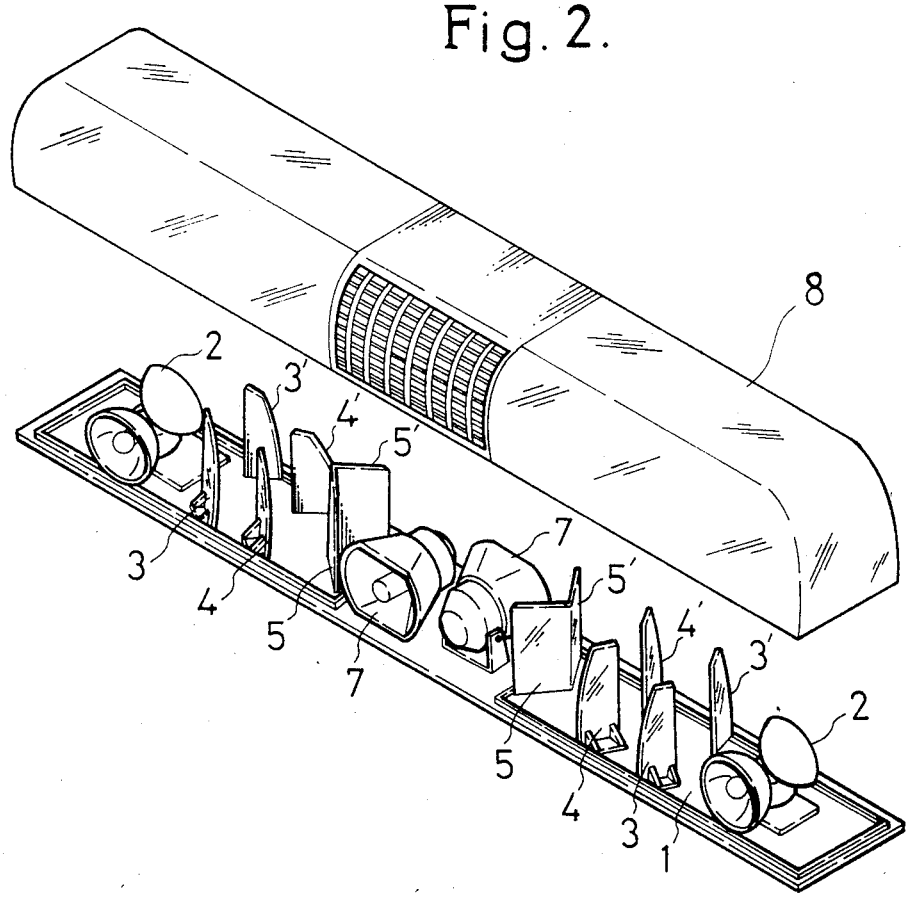
FIG. 2 is a perspective view of the first embodiment of the present invention.
Figure 3:
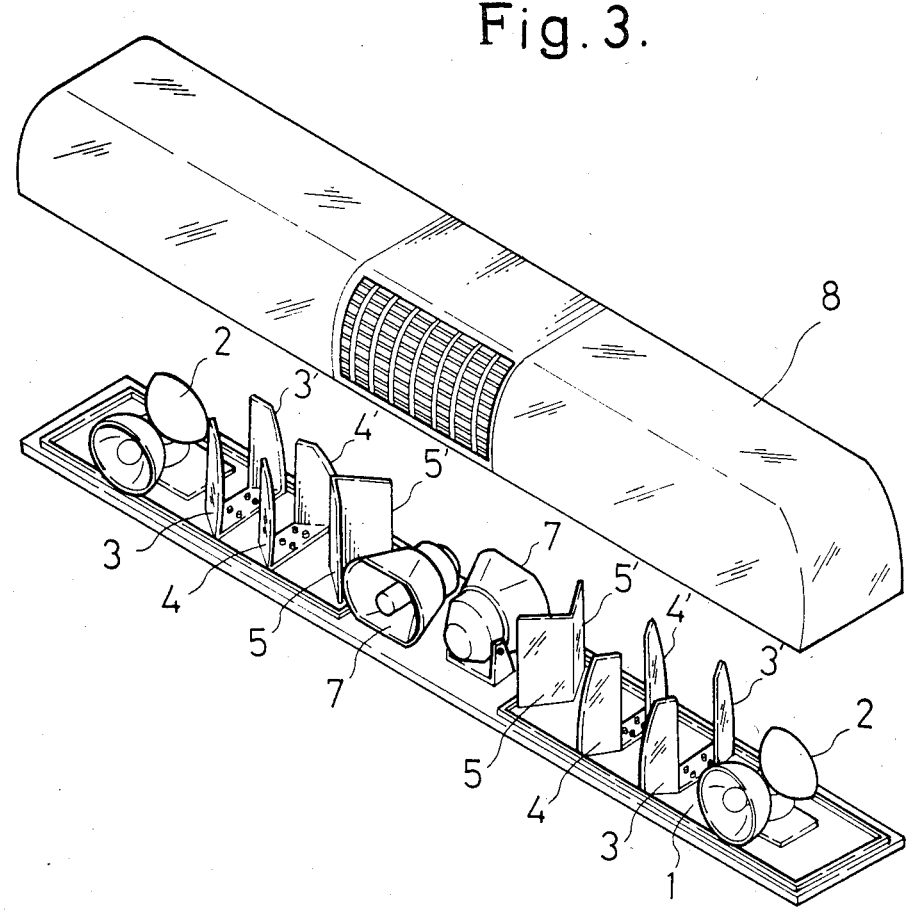
FIG. 3 is a perspective view of the second embodiment.
Figure 4:
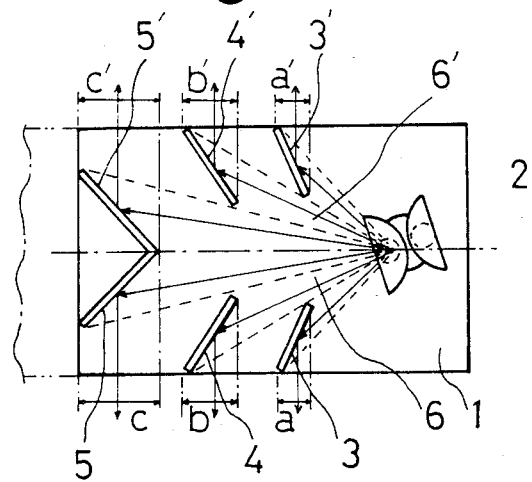
FIG. 4 is a descriptive view of the present invention.
Figure 5:
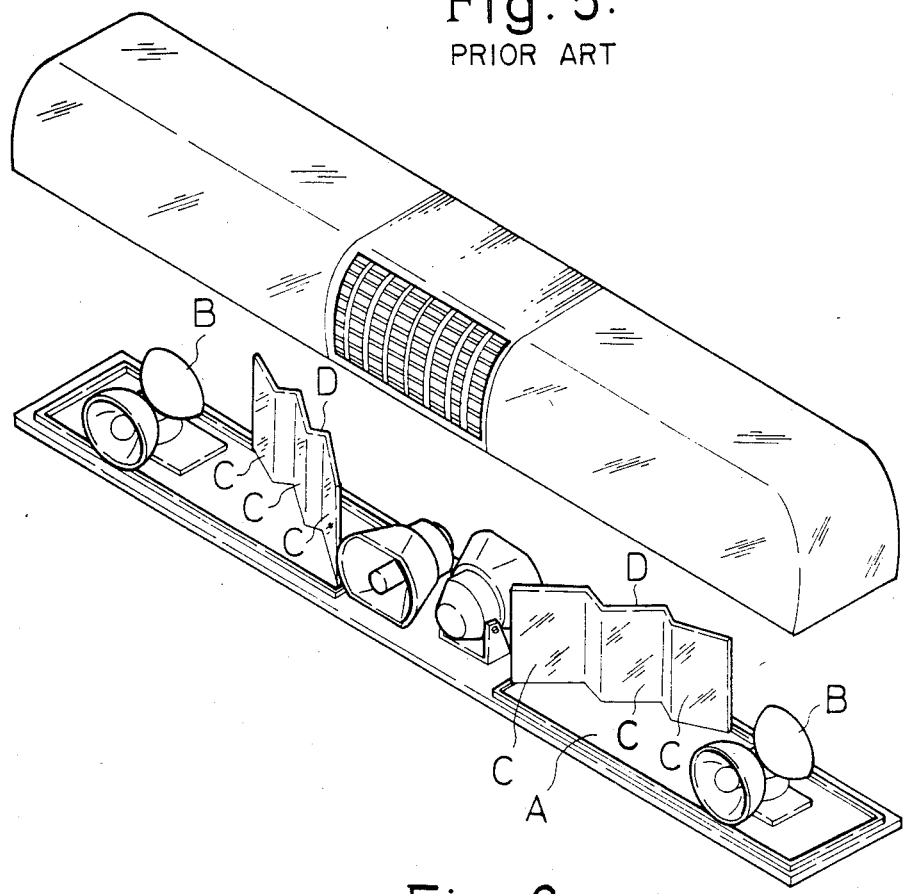
FIG. 5 is a perspective view of the conventional reflection type flow-flashing light.
Figure 6:
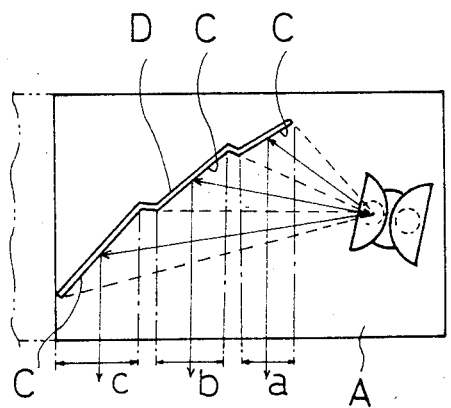
FIG. 6 is a descriptive view of FIG. 5.

The preferred embodiment of the reflection type flow-flashing light Z according to the present invention, which is mounted for use on the roof T of the emergency vehicle S such as the police patrol car, may be described in detail in conjunction with FIGS. 2, 3, & 4 illustrating the embodiment as stated below:

The rotating lights 2 connected to a lower motor (not shown) are rotatably installed on the opposite side ends of the unit base 1, while a plurality of reflecting plates 3, 4, & 5 are adequately spaced on the front section of the side part of said rotating lights 2 on the unit base 1 with their inclining angles different from each other formed in relation to said rotating lights 2. At the same time a space 6 of a given width is provided, namely a passage for the light being installed on the rear section of said reflecting plates 3 & 4. In a similar manner, a plurality of reflecting plates 3', 4' & 5' are spaced on the rear section of the side part of said rotating lights 2 with their inclining angles different from each other formed in relation to said rotating lights 2. At the same time a space 6' is provided of a given width, namely a passage for the light being installed on the rear section of reflecting plates 3 and 3', 4 and 4', & 5 and 5' on separate sections, respectively of the unit base 1 as shown in FIG. 2 or a pair of the unit are installed on the base 1, while being formed by a monolithic molding as shown in FIG. 3. The variant of the rotating lights 2, which is not limited to the illustrative form, may take various kinds of shapes such as an electric lamp and the reflecting plates are not restricted to 3 lines as illustrated, being able to be installed in a plurality of lines such as 2 lines and more than 3 lines. In addition, sirens 7 are mounted on the base 1 together with a transparent cover unit 8.

Thus, the structure of the present invention in which a plurality of reflecting plates 3, 4 & 5 and 3', 4', 5' are spaced adequately on the side sections of the rotating lights 2 with their predetermined inclining angles formed in relation to the rotating lights 2, respectively may cause the reflecting plates 3, 4, & 5 provided on the front section to perform the forward flood of said reflection-refracted rays, while shifting irradiated focus of points in succession, when turning the rotating lights 2 in an arrow direction and subsequently may perform the reflected flood toward the backward section, if the light is shifted to reflect against the reflecting plates 3', 4' & 5' provided on the rear section.

Particularly in the present invention, since the predetermined spaces 6 & 6', provided between the front and rear reflecting plates 3 and 3' & 4 and 4', are adapted to form the passage for the light, the light from the rotating lights 2 flows without being broken during its middle course and is by way of said spaces 6 and 6' reflection-refracted by the mirrors of the reflecting plates, while enlarging its reflection area a, b, & c and a', b', and c'.

I claim:

1. A reflection type flow-flashing light comprising: an elongated base having a forward and rearward direction;
   at least one rotating light operatively positioned at one end of said elongated base;
   a plurality of reflecting plates being spaced relative to each other and being mounted on said elongated base adjacent to said rotating light, each of said reflecting plates being disposed at a predetermined position for enabling light emitted from said rotating light to pass therebetween to impinge upon each of said reflecting plates while reflecting said light in a direction both forward and rearward;
   said elongated base includes a first end and a second end, said at least one rotating light being positioned adjacent to said first end and further including a second rotating light operatively positioned adjacent to said second end and a plurality of reflecting plates being spaced relative to each other and being mounted on said elongated base adjacent to said second rotating light, each of said reflecting plates being disposed at a predetermined position for enabling light emitted from said rotating light to pass therebetween to impinge upon each of said reflecting plates while reflecting said light in a direction both forward and rearward.

2. A reflection type flow-flashing light comprising:
   an elongated base having a forward and rearward direction;
   at least one rotating light operatively positioned at one end of said elongated base;
   a plurality of reflecting plates being spaced relative to each other and being mounted on said elongated base adjacent to said rotating light, each of said reflecting plates being disposed at a predetermined position for enabling light emitted from said rotating light to pass therebetween to impinge upon each of said reflecting plates while reflecting said light in a direction both forward and rearward;
   said plurality of reflecting plates includes a first, second and third group of plates, the first and second groups each containing two reflecting plates positioned at an angle relative to said base for reflecting said light in a direction both forward and rearward and being spaced relative to each other for permitting light to pass therebetween, and said third group containing a single reflecting plate bent at an angle for reflecting said light in both a forward and rearward direction.

3. A reflection type flow-flashing light according to claim 1, wherein said plurality of reflecting plates includes a first, second and third group of plates, the first and second groups each containing two reflecting plates positioned at an angle relative to said base for reflecting said light in a direction both forward and rearward and being spaced relative to each other for permitting light to pass therebetween, and said third group containing a single reflecting plate bent at an angle for reflecting said light in both a forward and rearward direction.

4. A reflection type flow-flashing light according to claim 1, wherein said plurality of reflecting plates reflects light in an orthogonal direction.

5. A reflection type flow-flashing light according to claim 2, wherein said plurality of reflecting plates reflects light in an orthogonal direction.

6. A reflection type flow-flashing light according to claim 1, and further including a siren for emitting a loud warning sound.

7. A reflection type flow-flashing light according to claim 1, and further including a transparent cover unit for mounting on said base.

* * * * *